2,728,805

POLYMERISATION OF OLEFINS

Hans Bohlbro, Hellerup, Copenhagen, Denmark, assignor to Esso Research and Engineering Company, a corporation of Delaware No Drawing. Application November 26, 1952,
Serial No. 322,819

Claims priority, application Great Britain
December 31, 1951

3 Claims. (Cl. 260—683.15)

The present invention relates to the catalytic polymerisation of olefins in the vapour phase and relates more particularly to the low pressure polymerisation of normally gaseous olefins to form liquid products boiling in the gasoline range.

In the refining of petroleum oils large quantities of hydrocarbon gases are produced, e. g., by cracking processes, which contain substantial amounts of olefins. In general the olefins are predominantly propylene and butylenes and by their controlled polymerisation there may be produced higher olefins boiling in the gasoline range. Such polymers may be used as such or after hydrogenation as a high octane gasoline blending stock.

Several methods are known for effecting such polymerisation, both catalytic and non-catalytic. The non-catalytic processes operate under elevated temperatures and pressures of the order of 1,000 lbs./sq. in. Many different catalysts have been proposed for use in the catalytic processes ranging from adsorbents such as activated clay, through mineral acids such as phosphoric and sulphuric acids to Friedel-Crafts type catalysts exemplified by the halides of aluminium and boron. The most commonly used catalysts for the so-called non-selective polymerisation of unsaturated refinery gases to gasoline products are of the phosphoric acid type. The Friedel-Crafts catalysts are more active in their action and are used mainly for polymerisation to higher products in the lubricating oil range, with or without simultaneous alkylation or arylation of the product.

In general such polymerisation reactions are carried out in so-called liquid phase and, therefore, under a suitably high pressure, the maintenance of which adds significantly to the cost of the process.

It is an object of the present invention to provide a process whereby high yields of hydrocarbons boiling in the gasoline range may be produced by catalytic polymerisation of normally gaseous olefins in the vapour phase and at relatively low temperatures and pressures.

The halides of boron, notably boron fluoride, are intrinsically attractive catalysts for such a process, but possess marked disadvantages arising from the fact that they are gases. Thus it is necessary to inject the catalyst in the gaseous state into the reaction zone which complicates control of the reaction to give optimum yields of products boiling in the desired range. Furthermore, excess catalyst is carried out with the liquid product which means that either polymerisation will continue to give undesirable higher polymers, or that the excess catalyst must be hydrolysed to make it inactive with consequent waste.

It is accordingly a further object of the invention to provide an improved boron halide catalyst and polymerisation process employing it, whereby good yields of gasoline hydrocarbons may be obtained from normally gaseous olefins with a low consumption of catalyst and simplified reaction control.

The reaction conditions of the process of the present invention involve temperatures of from 0° C. to 200° C. and pressures sufficiently low to maintain the reactant olefins in vapour phase. Preferably low temperatures such as room temperature or 20 or 30° C. are employed, although higher temperatures such as 70° C. or 100° C. or even higher may be used for example at the end stages of a batch process where the catalyst activity has begun to diminish. In general the temperature will be chosen so as to give optimum results relative to catalyst activity (percent conversion) on the one hand and catalyst stability on the other. At higher temperatures such as those above 150° C. there is a tendency for the catalyst to evaporate unduly rapidly. The reaction pressure is dictated largely by the source of the olefin feed and the maintenance of vapour phase operation. This, of course, means that the olefin gases are in vapour phase while the gasoline product is in the liquid phase. The process works well at atmospheric pressure, but higher pressures, e. g. up to 10 atmospheres or even more, may be used, especially when the olefins come from a source in which they are already under a substantial pressure, e. g. a refinery $C_4$ cut. In such cases there is obviously no point in reducing the pressure to atmospheric, while equally when the gases are delivered at atmospheric pressure there is little point in compressing them excessively. In general the selection of a suitable reaction pressure will be a matter of common sense, bearing in mind that the lower the pressure the lower will be the volumetric efficiency of the reactor, and the higher the pressure the greater will be the investment cost of the plant.

As already stated the preferred feed olefins are cracked refinery gases which will normally contain propylene and mixed butylenes, together with some propane and butanes. For special purposes purified feeds may be used, e. g. propylene or isobutylene alone. Also the presence of ethylene in the feed is not disadvantageous.

It has now been found, according to the present invention, that dihydroxyfluoboric acid, $HBF_2(OH)_2$ is not only an effective catalyst for a polymerisation reaction of this type, but that it will absorb free boron trifluoride, $BF_3$, and hold it relatively firmly to form an even more potent catalyst. A further feature of the invention is the employment of the dihydroxyfluoboric acid with or without absorbed boron fluoride on a suitable solid carrier. Such a carrier may comprise absorbent or adsorbent materials such as activated carbon, activated clay, silica gel, fuller's earth, kieselguhr, pumice and the like.

Dihydroxyfluoboric acid may be prepared from boron fluoride, boric acid and water in accordance with the equation:

$$2BF_3 + 3H_2O + H_3BO_3 \rightarrow 3HBF_2(OH)_2$$

It is a viscous colourless liquid which may be distilled without decomposition at atmospheric pressure. Its boiling point is 159–160° C. which, when taken in conjunction with the reaction pressure, imposes a practical limitation on the reaction temperature. It freely dissolves boron fluoride and the preferred catalysts of the invention comprise the dihydroxyfluoboric acid, together with from 0.25 to 1 molar proportions of $BF_3$. A 2:1 molar mixture is very suitable. This may be used as such in the reaction zone, for example by allowing the liquid to trickle down over suitable non-adsorbent packing elements such as glass or porcelain balls, with recycling of the accumulator liquid from the bottom to the top of the reactor if desired. It is preferred, however, to use an absorbent support such as activated carbon or those previously mentioned. In this case also make-up liquid may be flowed at a controlled rate over the catalyst so as to maintain activity. The olefins to be polymerised may flow upwardly or downwardly through the reactor, the liquid product being withdrawn from the bottom in either case. The catalyst liquid is much heavier than the liquid hydrocarbon product and substantially insoluble in it so that separation and recycling present no difficulties.

The following examples will serve to illustrate the invention. In all cases the feed gas used consisted of mixture by volume of propane 15%, isobutylene 20%, n-butylenes 35%, butanes 30%. The catalyst consisted of 13.3 grams of the liquid specified absorbed on 20 cc. of activated carbon. The gases were passed downwardly through a bed of the catalyst maintained in a glass tube equipped with a heating coil. In all cases the space velocity was 100 vols. gas/vol. catalyst/hour.

Yields or "percentage conversion" were measured both by direct weighing of the liquid product, and by analysis of the feed and effluent gas stream.

The term "percentage conversion" as used here is a measure of the crude liquid product obtained including dissolved gas. Thus measurement of the feed and effluent gas rates provides a measure of total gas disappearance, this gas appearing predominantly as olefin polymer, with small amounts of paraffin alkylate in some cases, and as dissolved gas, in the liquid product. For convenience the gas disappearance has been assumed to be 100% olefin and the % conversion is thus the total gas consumed as a percentage of the initial olefin content. In some cases this exceeds 100% which is partly attributable to the presence of dissolved gas and partly to alkylation. This has been checked by measurement of the actual olefin disappearance as the difference between the olefin content of the feed and of the effluent and the results so obtained correlate reasonably well with those obtained by direct weighing of the liquid product and by measuring total gas disappearance.

*Example 1*

The catalyst consisted of redistilled dihydroxyfluoboric acid containing a small amount of free boron fluoride. The reaction temperature was maintained at 20° C. for 47.5 hours during which time the % conversion, as measured by olefin disappearance, rose from an initial value of 28% to a maximum of 46% after 3 hours, and then diminished gradually to a value of 44.5%. The temperature was then raised to 70° C. when the conversion rate rose to 55.5%, and maintained at this temperature until the total reaction time had reached 170 hours, when the conversion rate had levelled off at about 26%.

The conversion rates, as measured by weighing the liquid product recovered from the reactor, were in substantial agreement with those given above.

The products from the runs at the two different temperatures were distilled and the gasoline yield evaluated as the percentage of the normally liquid portion boiling from 101–205° C. The results are tabulated below:

| Reaction temperature | 20° C. | 70° C. |
| --- | --- | --- |
| Analysis: | Percent | Percent |
| Dissolved gas | 21 | 23 |
| 101–205° gasoline | 65 | 68 |
| 205°+higher polymers | 14 | 9 |
| Gasoline in distillate | 82 | 88 |

*Example 2*

To evaluate the effect of the free boron fluoride, a catalyst was prepared from dihydroxyfluoboric acid from which excess $BF_3$ had been carefully removed by prolonged refluxing followed by distillation.

The run was continued for 20 hours at 20° C. during which time the conversion increased from 20 to 40%. Once again the extent of alkylation was negligible.

*Example 3*

In this run the amount of free boron fluoride was increased to 0.54 mole per mole of acid. Once again the reaction was started at 20° C. and the temperature raised later to 70° C.

The run at 20° C. was continued for 117 hours during which time the conversion increased rapidly from about 76% to 80% and then dropped to a steady value of about 70%. When the temperature was raised to 70° C. the conversion increased to about 98% but then dropped fairly rapidly until after a total of 235 hours on stream the conversion rate was about 34%. This may well be due to evaporation of the catalyst at this temperature.

Distillation of the liquid products gave the results indicated below:

| Reaction temperature | 20° C. | 70° C. |
| --- | --- | --- |
| Analysis: | Percent | Percent |
| Dissolved gas | 20 | 25 |
| 101–205° gasoline | 52 | 60 |
| 205°+higher polymers | 28 | 15 |
| Gasoline in distillate | 65 | 80 |

*Example 4*

In this example, the effect of adding supplementary catalyst during the run was investigated. The catalyst liquid consisted of the acid together with 0.51 molar proportion of boron fluoride, and in addition to the 20 cc. of catalyst impregnated carbon in the reactor, fresh liquid was dripped onto the catalyst layer at a rate of 0.15 cc. liquid per litre of feed gas.

The run was started at 100° C. and the yield increased rapidly from about 78% to a figure of about 105%, at which it remained constant for about 40 hours. It is evident that quite significant alkylation was occurring. After the 40-hour period, the temperature was increased to 140° C., but the yield then diminished and levelled off at a value of about 92%, rising to about 98% after 72 hours.

The temperature was then raised to 180° C. and maintained at that figure for a further 24 hours. The yield again rose to a value of about 104% at which it remained fairly constant.

Analysis of the products of the runs at 100° C., 140° C. and 180° C. showed gasoline in distillate percentages of 40, 60 and 66 respectively, thus indicating better selectivity at the higher temperatures.

From the preceding examples it will be clear that the dihydroxyfluoboric acid employed in the process of the present invention is an effective catalyst, and that by virtue of its high adsorptive capacity for boron fluoride it provides a flexible medium by which boron halide type catalysts of varying degrees of activity may be produced. The stability of the simple and complex catalysts so produced is such as greatly to facilitate control of the polymerisation reaction and economical use of catalyst. The choice of optimum catalyst composition and reaction conditions for any given feedstock and any desired product distribution may be ascertained by relatively simple experiment.

Various modifications of the operating technique described may be incorporated, particularly when operating on the plant scale as will be clear to those skilled in the art. Thus, for example, the gases may be passed through a bed of catalyst consisting of a suitable absorbent impregnated with an acid/$BF_3$ complex, while supplementary liquid complex is sprayed over the top of the catalyst bed. Liquid catalyst complex and liquid olefin polymers flowing out from the bottom of the bed are stratified and the polymer product pumped off to be neutralised with alkali to hydrolyse any entrained or dissolved catalyst, while the catalyst complex is withdrawn to storage where additional $BF_3$ may be added if necessary before it is recycled to the reactor through the spray nozzles.

In an alternative embodiment a guard bed of unimpregnated absorbent may be maintained on the outlet side of the catalyst bed so that the catalyst lost from the active part of the bed is reabsorbed in the inert part. When the bulk of the catalyst has been transferred from the active to the inactive part of the bed, the direction of flow of the feed gases may be reversed, with the result that in due course the catalyst will be retransferred back to the original active portion. Supplementary make-up catalyst may, of course, be added as well to compensate for any absolute catalyst loss.

Thus, to summarise, the present invention provides an improved process for the vapour phase polymerisation of normally gaseous olefins to products boiling in the gasoline range in which dihydroxyfluoboric acid is employed as catalyst. This catalyst preferably has excess boron halide dissolved in it and in the preferred form of the invention it is used supported on a solid carrier.

What I claim is:

1. A process for polymerizing normally gaseous olefins to form polymers boiling in the gasoline range which comprises passing said olefins through a catalyst bed comprising dihydroxyfluoroboric acid absorbed on a solid, granular absorbent carrier maintained under polymerization conditions, and, at least intermittently during said process, adding dihydroxyfluoroboric acid to said catalyst bed to maintain the activity thereof at a high level.

2. A process as in claim 1 wherein said dihydroxyfluoroboric acid contains in the range of about 0.25 to 1.0 molar proportion of $BF_3$ per mol of said acid.

3. A method according to claim 1 wherein the feed gases pass through a bed of active catalyst followed by a bed of unimpregnated absorbent to absorb catalyst carried from the active bed and wherein the direction of flow of the feed gases is reversed when a substantial proportion of the catalyst has been transferred to the initially unimpregnated bed.

References Cited in the file of this patent

UNITED STATES PATENTS

| | | |
|---|---|---|
| 2,109,340 | Niewland et al. | Feb. 22, 1938 |
| 2,171,207 | Boultbee | Aug. 29, 1939 |
| 2,183,503 | McAlevy | Dec. 12, 1939 |
| 2,224,349 | Holm et al. | Dec. 10, 1940 |
| 2,404,788 | Burk et al. | July 30, 1946 |
| 2,467,326 | Mavity | Apr. 12, 1949 |